Oct. 31, 1939.                     I. JEPSON                        2,178,395

VARIABLE SPEED TRANSMISSION

Filed May 26, 1937

INVENTOR

IVAR JEPSON

BY John W. Michael

ATTORNEY

Patented Oct. 31, 1939

2,178,395

UNITED STATES PATENT OFFICE 2,178,395

VARIABLE SPEED TRANSMISSION

Ivar Jepson, Oak Park, Ill., assignor, by mesne assignments, to Graham Transmissions, Inc., Wilmington, Del., a corporation of Delaware Application May 26, 1937, Serial No. 144,847

8 Claims. (Cl. 74—281)

This invention relates to an improvement in variable speed transmissions of the type wherein a plurality of longitudinally tapered planet rollers are controlled in their action by an encircling traction ring adjustable lengthwise of the rollers to vary the speed and direction of the motion transmitted by the device.

One of the objects of the invention is to simplify and compact a device of this character and so closely and advantageously organize its elements as to make feasible the construction of a transmission of this type in a unit of very small size, for example, fractional horse power units.

Another object of the invention is to provide a transmission of this character and having the advantages mentioned and which is susceptible of very economical production.

A further object of the invention is to provide a transmission of the character referred to and wherein the planet rollers are combined in a special way with their rotary carrier so as to insure the development of the desired working pressure between the rollers and their encircling traction ring under the influence of centrifugal force resulting from the rotation of the rollers with the carrier. When desired the centrifugal force may be conveniently supplemented in its action by springs combined in a novel manner with the rollers and carrier.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1:
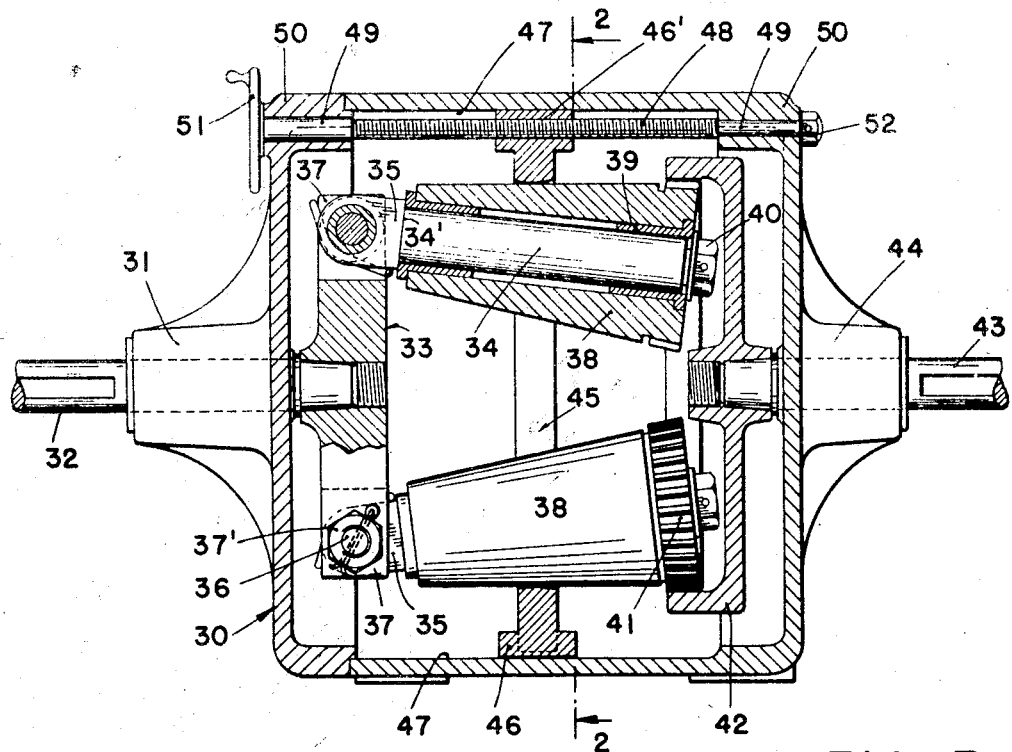
Figure 1 is a view partly in side elevation and partly in vertical longitudinal section showing a variable speed transmission embodying the present invention.
Figure 3:
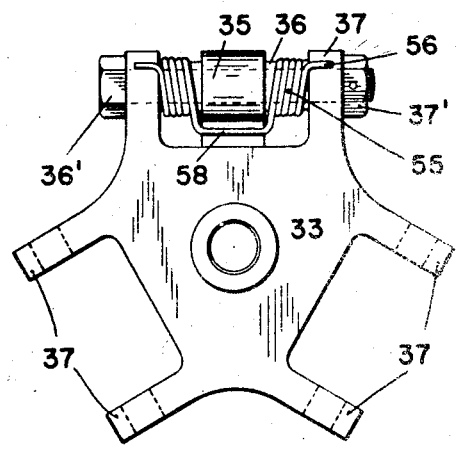
Figure 3 is a detail view in elevation showing the spider or rotary carrier and illustrating one of the planet roller shafts combined therewith.
Figure 2:
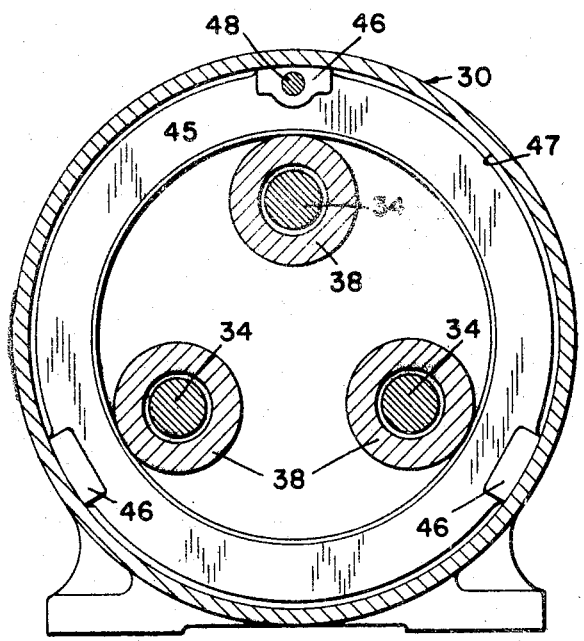
Figure 2 is a view in transverse section taken on line 2—2 of Figure 1.

Referring to the drawing the numeral 30 designates the housing which is provided at one end with an elongated bearing 31 in which a drive shaft 32 is supported for rotation. The inner end of the drive shaft 32 projects inwardly beyond the bearing 31 and has fastened thereto the central portion of a single plate-like carrier or spider 33.

A suitable number of stub shafts 34 are provided. In this instance, three are shown. Each stub shaft is formed at one end with a sleeve-like bearing structure 35 through which a mounting pin 36 extends. Each mounting pin 36 is supported in a pair of mounting lugs 37 integrally formed with the spider 33. Each mounting pin 36 may be provided with an integral head 36' at one end and a nut 37' at its outer end to releasably secure it to its mounting lugs. With this construction each stub shaft 34 is constrained to revolve with the carrier 33 but may swing toward and away from the axis of rotation of the carrier. The bearing structure 35, the pin 36 and mounting lugs 37 are constituted to take the torque.

A planet roller 38 is mounted on each stub shaft 34. Preferably flanged sleeve bearing bushings 39 are positioned in between the ends of each planet roller and its stub shaft. A bolt and washer 40 coacts with one end of the stub shaft and the flange of the adjacent bearing bushing 39 to retain the planet roller against axial displacement relative to its stub shaft. When each bolt 40 is tightened up the flange of the bearing bushing remote therefrom abuts a shoulder 34' provided on its shaft 34.

Each planet roller 38 has connected to it a planet pinion 41 and an encircling ring gear 42 meshes with these planet pinions 41 and is fastened to the inner end of a driven shaft 43 supported for rotation in a bearing 44 provided therefor in the housing.

A traction ring 45 encircles planet roller 38 and is adjustable lengthwise thereof to control its motion. In this instance the traction ring is not floated but has accurately machined guide lugs 46 engaging a bore 47 in the housing so that the position of the ring is accurately determined and controlled. For the purpose of adjusting the ring longitudinally of the rollers 38 one of the guide lugs is provided with an internally threaded opening 46' and hence is caused to serve as a nut which has threaded engagement with an operating screw 48 provided with round and smooth end portions 49 supported in bearings 50 provided on the housing. A hand wheel 51 is fastened to one end of the screw to facilitate turning thereof. The hub of this hand wheel and a nut 52 fastened to the opposite end of the screw 48 coact with the housing to preclude axial motion of the screw while allowing the wheel to freely rotate.

When the transmission is in operation centrifugal force swings the planet rollers and their stub shafts 34 outwardly into pressure contact with their encircling traction ring. If desired this action of centrifugal force may be supplemented by the provision of springs or elastic biasing means. For example, a torsion coil spring 55 may have coils encircling each mounting pin 36, ends 56 bearing against the mounting lugs 37 and a transversely extending intermediate portion 58 bearing upwardly and outwardly against the bearings 35 of the stub shaft.

In the construction described each non-rotating stub shaft is supported on and overhung from a single plate-like carrier element which is supported from one side only. However, the arrangement provides for the support and control of the planet rollers. Such a structural organization greatly simplifies and compacts the construction and renders practical and feasible the commercial embodiment of a variable speed transmission of this type in a fractional horse power unit.

Furthermore, the effect of centrifugal force in developing a working pressure between the planet rollers and the traction ring increases as the ring is moved toward the small end of the rollers. This is desirable inasmuch as it results in the development of high torque at low speeds. And the long pivot pin 36 by which each planet roller stub shaft is mounted provides a construction which is adequate to take the torque load. The arrangement is such that a definite and controlled as distinguished from an indeterminate loading is had, and since the planet rollers swing independently it is not necessary to floatably mount their traction ring.

The construction is rugged and simple so as to be reliable and durable in use and yet is easy and comparatively inexpensive to manufacture.

While I have shown and described one construction in which the invention may be advantageously embodied it is to be understood that it has been selected merely for the purpose of illustration or example and that various changes in the size, shape and arrangement of the parts may be made without departing from the spirit of the invention or the scope of the subjoined claims.

The invention claimed is:

1. A variable speed transmission of the character described comprising a rotary carrier, a shaft having one end pivotally connected to the carrier for swinging movement toward and away from the axis of rotation thereof, a planet roller rotatably mounted on said shaft and swingable therewith, and a traction ring surrounding the roller and adjustable lengthwise thereof to control its motion, said roller and said shaft being swung outwardly under the influence of centrifugal force when said carrier rotates whereby the roller is brought into pressure contact with said ring.

2. A variable speed transmission of the character described comprising a rotary carrier, a stub shaft having one end pivotally connected to the carrier for swinging movement toward and away from the axis of rotation thereof, a planet roller rotatably mounted on said shaft and swingable therewith, and a traction ring surrounding the roller and adjustable lengthwise thereof to control its motion, said roller and said shaft being swung outwardly under the influence of centrifugal force when said carrier rotates whereby the roller is brought into pressure contact with said ring, and a spring between said carrier and said shaft to supplement the action of centrifugal force.

3. A variable speed transmission of the character described comprising a rotary carrier, a stub shaft having one end pivotally connected to said carrier for swinging movement toward and away from the axis of rotation thereof, a planet roller, sleeve bearings for rotatably mounting said roller relative to the shaft, said shaft and said roller being swingable as a unit, and a traction ring surrounding the roller and adjustable lengthwise thereof to control its motion.

4. A variable speed transmission of the character described comprising a housing having a bore, a carrier supported for rotation in the housing, a stub shaft having one end pivotally connected to the carrier for swinging movement transversely with respect thereto, a planet roller rotatably mounted on said shaft and swingable therewith, a traction ring surrounding the roller and having means slidably engaged with the bore of the housing and means for sliding the ring along said bore and lengthwise of the rollers to control their motion.

5. A variable speed transmission of the character described comprising a housing, a carrier supported for rotation in the housing, a shaft having one end pivotally connected to the carrier for swinging movement transversely with respect thereto, a planet roller rotatably mounted on said shaft and swingable therewith, a traction ring encircling the roller, means constraining the ring to sliding movement longitudinally of the roller, and means for sliding the ring.

6. A variable speed transmission of the character described comprising a single plate-like carrier, means supporting said carrier for rotation, said carrier having a plurality of pairs of mounting lugs, a plurality of shafts, pins supported in said lugs and connected with the ends of said shafts to support the shafts on the carrier for rotation therewith and for swinging movement transversely with respect to the axis thereof, a conical planetary roller rotatably mounted on each of said shafts and swingable therewith, and a traction ring encircling said rollers and adjustable lengthwise thereof to control their motion.

7. A variable speed transmission of the character described comprising a rotary carrier, a plurality of shafts, each shaft having one end pivotally connected to the carrier so as to be rotatable therewith and swingable transversely with respect to the axis of rotation of the carrier, a conical planetary roller rotatably mounted on each shaft and swingable therewith, and a traction ring encircling said rollers and adjustable lengthwise thereof to control their motion.

8. A variable speed transmission of the character described comprising a single plate-like carrier, means supporting the carrier for rotation, said carrier having at least one pair of spaced lugs, a stub shaft, a long pivot pin mounted on said lugs and interconnected with the stub shaft to support the same on the carrier for rotation therewith and for swinging movement transversely with respect therewith, the major portions of the stub shaft overhanging one side of the carrier, a planet roller rotatably mounted on the overhung portion of said shaft and swingable therewith, and a traction ring encircling the roller and movable lengthwise thereof to control its motion.

IVAR JEPSON.